United States Patent
Tsai

(10) Patent No.: US 8,459,420 B2
(45) Date of Patent: Jun. 11, 2013

(54) BRAKE LEVER ASSEMBLY WITH TWO CYLINDER UNITS

(76) Inventor: Szu-Fang Tsai, Changhua County (TW)

(*) Notice: Subject to any disclaimer, the term of this patent is extended or adjusted under 35 U.S.C. 154(b) by 90 days.

(21) Appl. No.: 13/178,160

(22) Filed: Jul. 7, 2011

(65) Prior Publication Data

US 2012/0305355 A1 Dec. 6, 2012

(30) Foreign Application Priority Data

May 31, 2011 (TW) .............................. 100119076 A

(51) Int. Cl.
*B60T 11/00* (2006.01)
(52) U.S. Cl.
USPC ............................ 188/344; 188/347; 188/348
(58) Field of Classification Search
USPC .................... 188/348, 347, 345, 344; 60/574, 60/576, 578
See application file for complete search history.

(56) References Cited

U.S. PATENT DOCUMENTS

| 2,106,758 | A | * | 2/1938 | Oliver ........................... 188/348 |
| 2,341,318 | A | * | 2/1944 | Forbes ............................ 60/577 |
| 2,557,758 | A | * | 6/1951 | Perry ............................. 60/576 |
| 5,127,506 | A | * | 7/1992 | Muller et al. ................ 192/85.6 |
| 2002/0070084 | A1 | * | 6/2002 | Chou .......................... 188/24.11 |
| 2006/0185360 | A1 | * | 8/2006 | Takizawa et al. ............ 60/547.1 |
| 2008/0302101 | A1 | * | 12/2008 | Dunlap .......................... 60/594 |

* cited by examiner

*Primary Examiner* — Bradley King

(57) ABSTRACT

A brake lever assembly includes a body connected to an oil pipe and includes a first room and a second room. A first path communicates between the storage space and the first room. A second path communicates between the first room and the second room. The oil pipe is connected to a hydraulic oil storage space in the body. A lever is pivotably connected to the body and includes a push portion. A first cylinder unit is located in the first room and connected between the oil pipe and the push portion. The first cylinder unit is operated a first travel. A second cylinder unit is located in the second room and has a first end contacting inside of the body and a second end connected to the push portion. The second cylinder unit is operated a second travel which is longer than the first travel.

4 Claims, 3 Drawing Sheets

BRAKE LEVER ASSEMBLY WITH TWO CYLINDER UNITS

FIELD OF THE INVENTION

The present invention relates to a brake lever assembly, and more particularly, to a bicycle brake lever assembly with two cylinder units.

BACKGROUND OF THE INVENTION

The conventional brake assembly for bicycles generally include drum brake assembly, cantilever brake assembly, V-type brake assembly and hydraulic disk brake assembly. All of the conventional brake assemblies are designed for the safety of the cyclists and the latest hydraulic disk brake assembly comprises a brake part fixed to the bicycle frame and a hydraulic operation unit is connected to the brake part so as to drive a piston of a cylinder. A brake lever is pivotably connected to the handlebar of the bicycle and the hydraulic oil is delivered to the piston by operation of the brake lever. The hydraulic oil drives a clamp to clamp the brake disk which is fixed to the axle of the wheel so that the wheel is stopped. There is only one set of the piston to be used to drive the clamp to brake the wheel.

A conventional hydraulic brake lever assembly known to applicant comprises a tubular frame with a narrowed open end and a lever is pivotably connected to one side of the open end of the frame. The frame is connected to the handlebar by the other side of the open end. A hydraulic pump unit has a piston received therein and a threaded section is formed at a narrowed end of the hydraulic pump unit. The threaded section is inserted through the frame and connected to a hydraulic oil pipe. The brake lever has a base portion that has a push rod which has an enlarged head inserted in the open end of the hydraulic pump unit. By operation of the brake lever, the piston is moved to drive the hydraulic brake assembly. The hydraulic pump unit is located in the frame so as to avoid the dust and water from entering the hydraulic pump unit. The parts of the hydraulic brake lever assembly can be easily replaced so that the cost of the maintenance is low.

However, the single hydraulic pump unit provides only one travel for the piston so that the gap between the lining plates and the brake disk has to be small enough such as 0.3 mm, to allow the lining plates to contact the brake disk as soon as possible to shorten the braking time required. However, because the gap is so small so that the brake disk contacts the lining plates during riding when the brake disk is deformed after a period of time of use. Therefore, both of the lining plates and the brake disk are worn. Furthermore, pebbles can be easily stocked in the small gap and wear the brake disk and the lining plates. The gap may also be changed when the frame, the hub, the front fork are not precisely installed.

The present invention intends to provide a brake lever assembly which includes two cylinder units to improve the shortcomings of the conventional brake assemblies.

SUMMARY OF THE INVENTION

The present invention relates to a brake lever assembly and comprises a body having an oil pipe connected to a first end thereof, and a storage space, a first room and a second room are located in the body. Hydraulic oil is received in the storage space. A first path communicates between the storage space and the first room, and a second path communicates between the first room and the second room. The oil pipe is connected to the storage space. A lever is a substantially L-shaped lever and has a pivotal portion, a push portion and an operation portion. The pivotal portion is pivotably connected to a second end of the body and the push portion is connected to the body and located close to the pivotal portion. The operation portion is located opposite to the pivotal portion. A first cylinder unit is located in the first room and connected between the oil pipe and the push portion of the lever. The first cylinder unit is operated a first travel. A second cylinder unit is located in the second room and has a first end thereof contacting an inside of the body and a second end of the second cylinder unit is connected to the push portion of the lever. The second cylinder unit is operated a second travel which is longer than the first travel. The first and second paths are located on the same line which has an angle relative to an axis of a handlebar, and the angle is less than 90 degrees.

When the lever is pivoted, the push portion of the lever pushes the first and second cylinder units, the first cylinder unit seals the first path before the second cylinder unit seals the second path.

The primary object of the present invention is to provide a brake lever assembly with two cylinder units so as to improve the shortcomings due to the gap between the lining plates and the brake disk.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
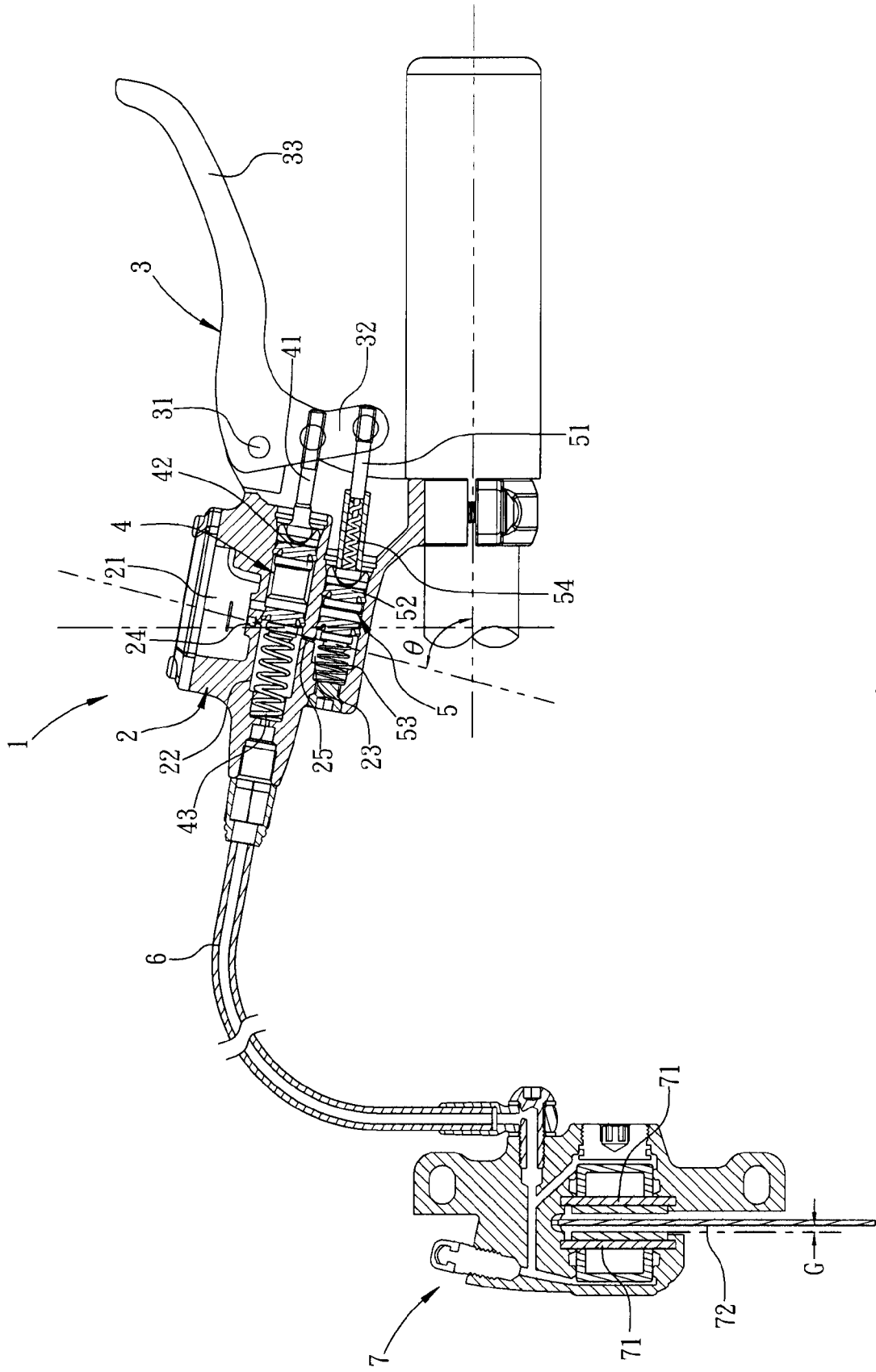
FIG. 1 is a cross sectional view of the brake lever assembly.
Figure 2:
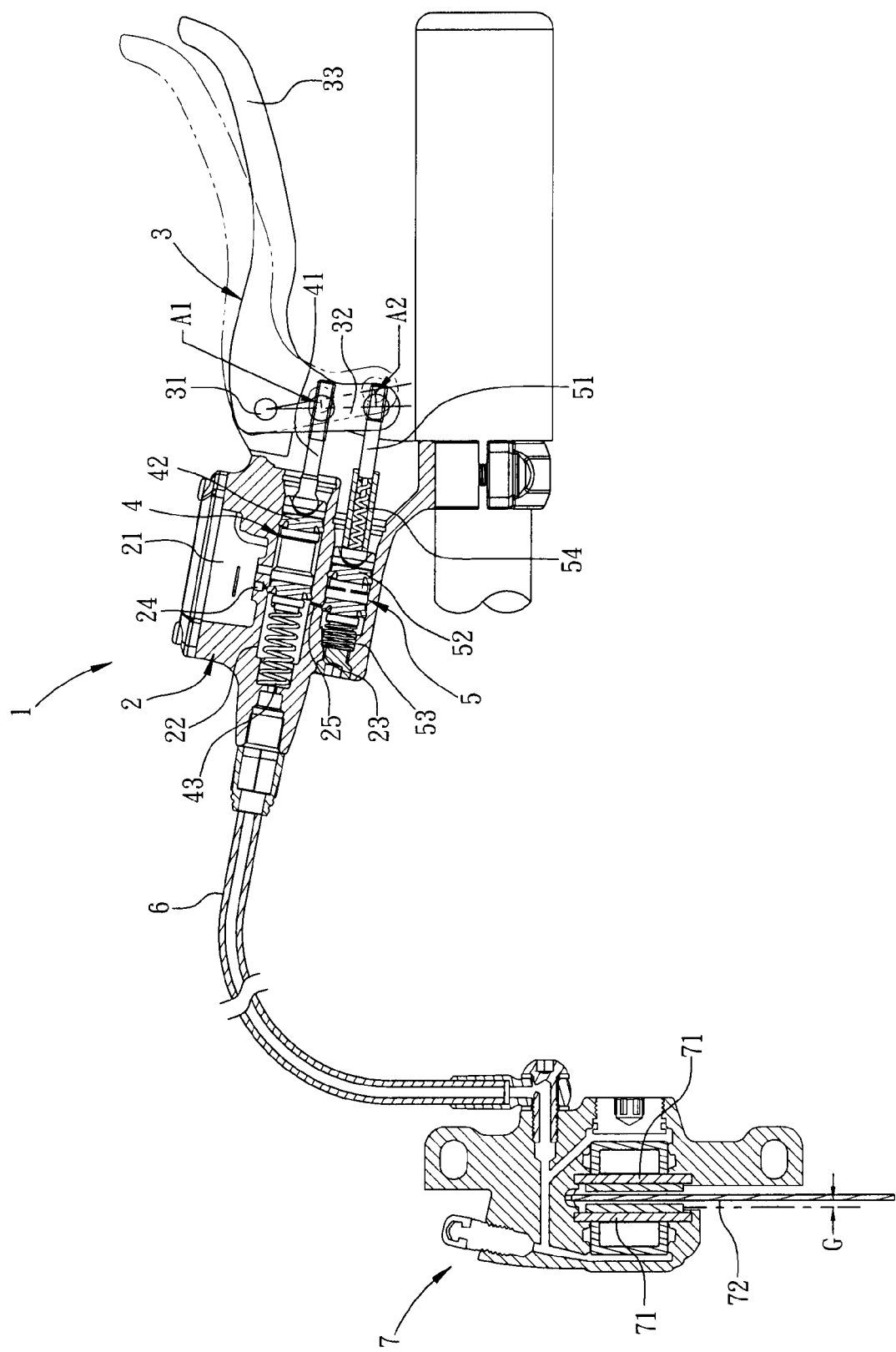
FIG. 2 is a cross sectional view of the brake lever assembly, wherein the lever is pivoted.
Figure 3:
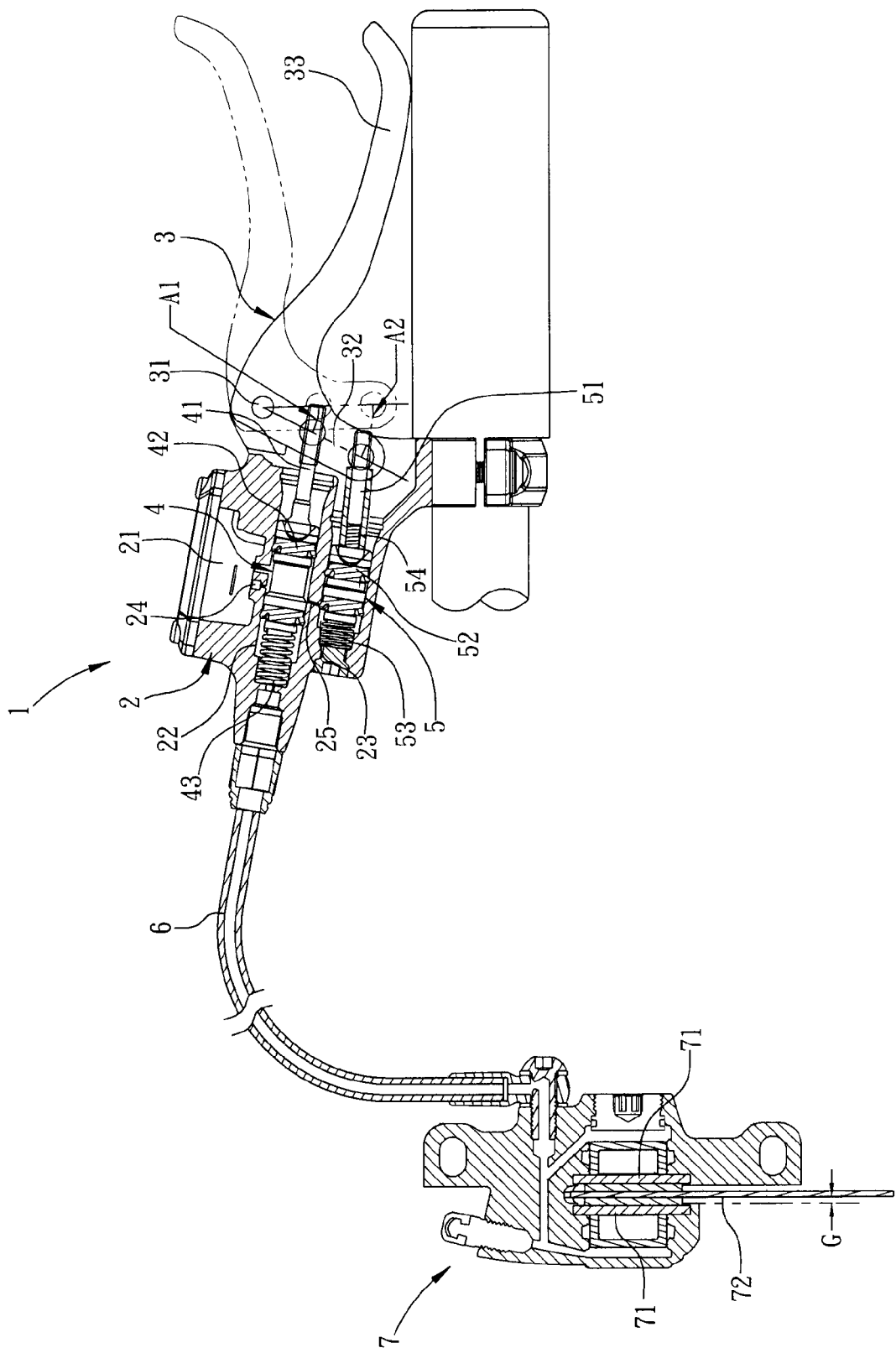
FIG. 3 is a cross sectional view of the brake lever assembly, wherein the lever is continuously pivoted.

Referring to FIGS. 1 to 3, the brake lever assembly 1 of the present invention is connected to a handlebar of a bicycle (not shown) and comprises a body 2, a lever 3, a first cylinder unit 4 and a second cylinder unit 5.

The body 2 has an oil pipe 6 connected to the first end thereof and the oil pipe 6 is connected to a brake part 7 fixed to the bicycle frame. The body 2 has a storage space 21, a first room 22 and a second room 23. Hydraulic oil is received in the storage space 21. The oil pipe 6 is connected to the storage space 21. A first path 24 communicates between the storage space 21 and the first room 22, and a second path 25 communicates between the first room 22 and the second room 23. The first and second paths 24, 25 are located on the same line which has an angle θ relative to an axis of the handlebar, and the angle θ is less than 90 degrees.

The lever 3 is a substantially L-shaped lever and has a pivotal portion 31, a push portion 32 and an operation portion 33, wherein the pivotal portion 31 is pivotably connected to the second end of the body 2. The push portion 32 is connected to the body 2 and located close to the pivotal portion 31. The operation portion 33 is located opposite to the pivotal portion 31.

The first cylinder unit 4 is located in the first room 22 and connected between the oil pipe 6 and the push portion 32 of the lever 3. The first cylinder unit 4 is operated a first travel A1. The first cylinder unit 4 includes a first piston rod 41, a first piston 42 and a first resilient member 43, wherein the first piston rod 41 is connected between the first piston 42 and the push portion 32 of the lever 3. The first resilient member 43 is biased between the first piston 42 and the inside of the body 2. The first resilient member 43 can be a spring.

The second cylinder unit 5 is located in the second room 23 and has a first end thereof contacting the inside of the body 2 and a second end of the second cylinder unit 5 is connected to the push portion 32 of the lever 3. The second cylinder unit 5 is operated a second travel A2 which is longer than the first travel A1. The second cylinder unit 5 includes a second piston rod 51, a second piston 52, a second resilient member 53 and a third resilient member 54. The second piston rod 51 has a first end connected to the push portion 32 of the lever 3, and a second end of the second piston rod 51 contacts the first end of the third resilient member 54. The second end of the third resilient member 54 contacts the first end of the second piston 52. The second end of the second piston 52 contacts the first end of the second resilient member 53. The second end of the second resilient member 53 contacts the inside of the body 2. The second resilient member 53 and the third resilient member 54 can be springs. The elastic coefficient of the third resilient member 54 is larger than that of the second resilient member 53.

The first and second pistons 42, 52 are respectively mounted by O-shaped piston rings to provide more sealing function.

When operation portion 33 of the lever 3 is pivoted, the push portion 32 of the lever 3 pushes the first and second cylinder units 4, 5 simultaneously, because the second travel A2 is larger than the first travel A1, and the angle θ defined above is less than 90 degrees, so that the first cylinder unit 4 seals the first path 24 before the second cylinder unit 5 seals the second path 25. When the first path 24 is sealed, the hydraulic oil in the storage space 21 cannot flow into the first room 22, and then the second path 25 is sealed by the second piston 52 as shown in FIG. 2. The lining plates 71 on the brake part 7 are moved toward the brake disk 72.

Although the second resilient member 53 is in contact with the inside of the body 2, the third resilient member 54 allows the brake lever 3 to be continuously pivoted so that the push portion 32 continuously move the first piston rod 41 and the lining plates 71 on the brake part 7 clamp the brake disk 72 as shown in FIG. 3.

By the specific arrangement, the gap G between the lining plates 71 and the brake disk 72 can be increased from 0.3 mm to 0.6 mm or more than 0.6 mm. This prevents the deformed brake disk 72 from contacting the lining plates 71 to affect the speed of the bicycle. The arrangement also improves the shortcomings of the narrowed gap due improper installation of the frame, the hub and the front fork.

While we have shown and described the embodiment in accordance with the present invention, it should be clear to those skilled in the art that further embodiments may be made without departing from the scope of the present invention.

What is claimed is:

1. A brake lever assembly comprising:
a body having an oil pipe connected to a first end thereof and a storage space, a first room and a second room located in the body, hydraulic oil received in the storage space, a first path communicating between the storage space and the first room, a second path communicating between the first room and the second room, the oil pipe connected to the storage space;
a lever being a substantially L-shaped lever and having a pivotal portion, a push portion and an operation portion, the pivotal portion pivotably connected to a second end of the body and the push portion connected to the body and located close to the pivotal portion, the operation portion located opposite to the pivotal portion;
a first cylinder unit located in the first room and being connected between the oil pipe and the push portion of the lever, the first cylinder unit having a first piston rod, a first piston and a first resilient member, the first piston rod connected between the first piston and the push portion of the lever, the first resilient member being biased between the first piston and the inside of the body, the first cylinder unit being operated a first travel, and
a second cylinder unit located in the second room and having a first end thereof contacting an inside of the body and a second end of the second cylinder unit being connected to the push portion of the lever, the second cylinder unit having a second piston rod, a second piston, a second resilient member and a third resilient member, the second piston rod having a first end connected to the push portion of the lever, a second end of the second piston rod contacts a first end of the third resilient member, a second end of the third resilient member contacting a first end of the second piston, a second end of the second piston contacting a first end of the second resilient member, a second end of the second resilient member contacting the inside of the body, the second cylinder unit being operated a second travel which is longer than the first travel.

2. The assembly as claimed in claim 1, wherein an elastic coefficient of the third resilient member is larger than that of the second resilient member.

3. The assembly as claimed in claim 1, wherein the first and second paths are located on the same line which has an angle relative to an axis of a handlebar, the angle is less than 90 degrees.

4. The assembly as claimed in claim 3, wherein the push portion of the lever pushes the first and second cylinder units when the lever is pivoted, the first cylinder unit seals the first path before the second cylinder unit seals the second path.

* * * * *